United States Patent [19]
Heyland et al.

[11] Patent Number: 5,480,663
[45] Date of Patent: Jan. 2, 1996

[54] AVOIDANCE OF BROWNING OF A FOOD PRODUCT

[75] Inventors: Sven Heyland, Weiningen; Violette Roth, Winterthur, both of Switzerland

[73] Assignee: Nestec S.A., Vevey, Switzerland

[21] Appl. No.: 963,854

[22] Filed: Oct. 20, 1992

[30] Foreign Application Priority Data

Nov. 1, 1991 [CH] Switzerland .............................. 3201/91

[51] Int. Cl.$^6$ .................................................. A23L 1/238
[52] U.S. Cl. ........................ 426/262; 426/535; 426/589; 426/634; 426/656
[58] Field of Search ..................................... 426/269, 634, 426/598, 658, 656, 535, 262, 589

[56] References Cited

U.S. PATENT DOCUMENTS

| | | | |
|---|---|---|---|
| 3,049,427 | 8/1962 | Fellers et al. ............................ | 426/269 |
| 3,352,691 | 11/1967 | Li et al. .................................... | 426/269 |
| 3,953,457 | 4/1976 | Dveikorn et al. .................... | 260/288 R |
| 3,966,985 | 6/1976 | Jonas . | |
| 4,286,089 | 8/1981 | Berges ........................................ | 544/27 |
| 4,722,846 | 2/1988 | Abe et al. ................................. | 426/634 |
| 4,765,997 | 8/1988 | Tominaga ................................. | 426/488 |
| 4,851,241 | 7/1989 | Tsuji et al. ............................... | 426/641 |
| 4,861,383 | 8/1989 | Ishida et al. .............................. | 426/269 |
| 4,900,564 | 2/1990 | Lee et al. .................................. | 426/269 |
| 4,956,190 | 9/1990 | Chawan et al. .......................... | 426/269 |
| 4,976,982 | 12/1990 | Gillmore et al. ........................ | 426/269 |
| 5,004,618 | 4/1991 | Buckholz et al. ........................ | 426/641 |
| 5,019,585 | 5/1991 | Loozen ..................................... | 514/396 |
| 5,126,153 | 6/1992 | Beck ......................................... | 426/269 |
| 5,141,756 | 8/1992 | Bajracharya et al. . | |
| 5,250,570 | 10/1993 | Brittain et al. ........................... | 514/622 |

FOREIGN PATENT DOCUMENTS

| | | | |
|---|---|---|---|
| 850600 | 9/1970 | Canada . | |
| 0176094 | 4/1986 | European Pat. Off. . | |
| 2057355 | 5/1971 | France ..................................... | 426/269 |
| 52-41343 | 10/1977 | Japan ....................................... | 426/634 |
| 54-70455 | 6/1979 | Japan ....................................... | 426/634 |
| 57100177 | 6/1982 | Japan . | |
| 63-44862 | 2/1988 | Japan ....................................... | 426/634 |
| 1285568 | 8/1972 | United Kingdom . | |

OTHER PUBLICATIONS

Winton et al 1935. The Structure and Composition of Foods. John Wiley & Sons, Inc. New York pp. 158 & 165.
Fennema, O. 1985. Food Chemistry. Mancel Dekker, Inc. New York, pp. 75 and 93.
Patent Abstracts of Japan vol. 15, No. 137, Abstract of JP-A-30 19 662 (1991).
Derwent Publications Ltd. AN75-31621W, Abstract of JP-A-57 198 066 (1982).
Derwent Pubications Ltd., AN91-166588, Abstract of No. Hu-A-54 879 (1991).

*Primary Examiner*—Anthony J. Weier
*Attorney, Agent, or Firm*—Vogt & O'Donnell

[57] ABSTRACT

To avoid browning of a food product containing amino acids and a carbohydrate having at least one free carbonyl group, including such as soy sauce, a compound which contains or is capable of developing a thiol group is incorporated into the food product in an amount of from 0.01 to 0.1 parts by weight and then the food product and compound are heat treated at a temperature of 95° C. to 110° C. for from 1 hour to 5 hours.

16 Claims, No Drawings

AVOIDANCE OF BROWNING OF A FOOD PRODUCT

BACKGROUND OF THE INVENTION

This invention relates to a method for the avoidance of browning of a food product comprising a source of amino acids and carbohydrates, and more particularly at least one free carbonyl group. This invention also relates to a food product which does not brown in the course of time.

A method for the preparation of soy sauce, by the fermentation of a koji, hydrolysis of the fermented koji, the addition of sodium chloride so as to obtain a moromi, followed by fermentation of the moromi, is known for example from European Patent No. 417481. A fermented soy sauce of a dark brown colour, which can be dried and stored for a long period, is obtained by pressing after pasteurisation and clarification of the pressed juice.

The dark brown colour of soy sauce is partly due to the Maillard reaction, a reaction which takes place when a mixture comprising amino acids and carbohydrates, containing at least one free carbonyl group, is treated with heat, for example by drying. The rate of browning of the material, and the colour obtained, depends mainly on the operating conditions, namely the temperature and the duration of the heat treatment.

In order to avoid such browning of the material during heat treatment, it is possible to control the temperature and duration of the reaction, and to stop it before the colour becomes too dark. This is., however, to the detriment of the flavour which is unable to develop completely.

It has been proposed, in Japanese Patent JP 57100177, that a colouring-inhibiting agent comprising at least one calcium salt, preferably calcium chloride, should be added to the mixture of amino acids and carbohydrates before the reaction. The mixture obtained is then less susceptible to browning, by the Maillard reaction, during subsequent heat treatment.

Another method for the avoidance of the browning of a product in the course of its preparation has been proposed by Canadian Patent No. 850 600, and consists of adding an organic compound, which is capable of hydrolysis in contact with water, to the mixture of amino acids and carbohydrates. The product obtained then retains its initial colour for at least 4 days' storage at 55° C., followed by 1 day at 90° C.

These various processes avoid, to some extent, the appearance of a dark brown colour, by the Maillard reaction, on heat treatment, during preparation of the final product.

However, when these food products have a high concentration of reducing sugars, as is the case, for example, in soy sauces and flavouring agents based on soya, these sugars can react during the product drying stage, and even in the course of storage, and alter the organoleptic qualities of the product, developing an undesirable dark colour and possibly a caramel taste.

SUMMARY OF THE INVENTION

The object of this invention is to provide a method whereby browning of the product during preparation and, if appropriate, also during drying, can be avoided, and to avoid alteration of the organoleptic qualities of the product, including its taste and colour, during storage.

The invention therefore relates to a method for the avoidance of the browning of a food product wherein 0.01 to 0.1 parts by weight of a compound, which includes or is capable of developing a thiol group, is incorporated into a food product containing amino acids and a carbohydrate having at least one carbonyl group, and the product obtained is heat treated at 95°–110° C. for 1–5 hours.

This invention also relates to a food product prepared in accordance with the process described above, carbohydrates containing at least one free carbonyl group, a source of amino acids and 0.01 to 0.1 parts by weight of a compound which contains or is capable of developing a thiol group, the product having been heat treated at 95°–110° C. for 1–5 hours.

In a preferred embodiment, the compound which contains or is capable of developing a thiol group is selected from the group consisting of cystine, cysteine, thiamine and hydrogen sulphide.

This method makes it possible to obtain a food product which has appearance and organoleptic qualities comparable to those of a product which has not been heat treated. However, the product treated according to this process is much more stable on storage. In fact, the method according to the invention makes it possible to thermally degrade free reducing sugars, which are still present in the product after preparation, and thus to bring about complete exhaustion of their reducing potential by causing them to react in the presence of a compound which contains or is capable of developing a thiol group. A product which does not contain free reducing sugars is obtained, namely a product which will not react during any subsequent drying and storage.

DETAILED DESCRIPTION OF THE INVENTION

This description, percentages and parts are indicated by weight, unless specified otherwise.

The method according to this invention may be applied to the preparation of any food product which contains amino acids on a source of amino acids and carbohydrates, which include at least one free carbonyl group.

Thus, in a first particular form of application of the invention, this method may be used for the preparation of a fermented soy sauce.

An example of the preparation of fermented soy sauce in powder form is provided in European Patent No. 417481, which is incorporated herein by reference.

In accordance with the method described in that application, a mixture of cooked soya and roast wheat is allowed to ferment in the presence of a culture of koji, the fermented product is hydrolysed in aqueous suspension at 45°–60° C. for 3–8 hours in the presence of the koji enzymes produced during fermentation, sodium chloride is then added to the hydrolysed product, and fermentation is again allowed to take place for several days. The product obtained is then pressed and the juice, which can be clarified and pasteurised, is recovered. In this way, a liquid soy sauce having a dry matter content of approximately 30% is obtained.

In accordance with a first embodiment of this application, 0.01 to 0.1 parts of a compound which contains or is capable of developing a thiol group can be added to one part of the liquid soy sauce. The mixture prepared in this way is then heat treated at 95°–110° C. for 1 to 5 hours. The heat treatment may, for example, be performed under reflux in a jacketed reactor.

After heat treatment, a clear coloured liquid sauce which can be used and/or stored as such, or which can be concentrated in order to obtain a paste, or which can again be dried and ground in order to obtain powdered soy sauce, is obtained.

It is also possible to perform continuous heat treatment in the paste drying stage, for example by first treating the paste in the dryer at 95°–110° C. for 1–5 hours, and then drying at 60°–80° C. under reduced pressure until a powder is obtained.

In accordance with a second embodiment of this application, when a powdered soy sauce is already available, 0.15–0.30 parts of water and 0.01–0.1 parts of a compound which contains or is capable of developing a thiol group may be added to one part of the powdered soy sauce in a manner which allows a paste having a dry matter content of 80–90% to be obtained, this paste may then be heat treated at 90°–110° C. for 1–5 hours.

The paste so treated can then be stored and/or used as such, or dried and ground in order to obtain a powdered soy sauce.

In another particular form of application of the invention, this process can be used when preparing a flavouring agent. An example of this is provided in European Patent No. 429 760 which is incorporated herein by reference.

In accordance with the method described in that application, an aqueous suspension of a protein-rich material is prepared, the suspension is hydrolysed at a pH of 6.0–11.0 using a protease to solubilise the proteins, the hydrolysed suspension is heat treated at pH 4.6–6.0 and the heat treated suspension is matured using koji enzymes. After maturation, the suspension can be pressed until a clear juice, which may be pasteurised and clarified, is extracted. This clear juice preferably has a dry matter content of approximately 30% and can be used as such as a flavouring agent.

In accordance with a first embodiment of this application, 0.01 to 0.1 parts of a compound which contains or is capable of developing a thiol group may be added to one part of the liquid flavouring agent followed by heat treatment at 95°–110° C. for 1–5 hours of the mixture obtained.

After heat treatment, a clear coloured liquid flavouring agent, which can be used as such or after concentration and/or drying and reduction to a powder, is obtained.

It is also possible for the heat treatment to be carried out continuously and/or simultaneously with the concentration and/or drying stage.

In accordance with a second embodiment of this application, when a powdered flavouring agent is already available, 0.15–0.30 parts of water and 0.01–0.1 parts of a compound which contains or is capable of developing a thiol group can be added to one part of the flavouring agent, followed by heat treatment of this mixture at 95°–110° C. for 1–5 hours.

The product obtained can then be stored and/or used as such, i.e., in the form of a paste containing 80–90% dry matter, or the paste can be dried and ground in order to obtain a powdered flavouring agent.

EXAMPLES

The invention is illustrated in greater detail by the following examples.

EXAMPLE 1

A liquid soy sauce having a dry matter content of 30% was prepared in accordance with European Patent 417481.

1% by weight, based on the weight of dry matter, of cysteine, HCl and $H_2O$ were added to the sauce. The mixture obtained was heat treated in a jacketed reactor for 5 hours at a temperature of 100° C.

The mixture was then allowed to cool to approximately 60°–70° C., and then concentrated in an evaporator to a temperature of 65° C. until a dry matter content of 85% was obtained.

The paste obtained was then dried in a dryer under a reduced pressure of 15 mbar at 70° C. for approximately 8 hours until a dry matter content of 98% was obtained, and then ground in a hammer mill.

This yielded a clear coloured powdered soy sauce (soy sauce C).

The intensity of the colour of the powdered soy sauce was determined by measuring the extinction coefficient of a 1% aqueous solution by means of a spectrophotometer using the following operating conditions:

cuvette: 1 cm wavelength: 50 nm

The same measurement was performed:

for a soy sauce which contained no cysteine which had not been heat treated at 100° C. for 5 hours (control A), and for a soy sauce prepared and heat treated as sauce C, but containing no cysteine (control B).

The following results were obtained:

|  | extinction coefficient | visual observations |
| --- | --- | --- |
| Control A | 0.36 | light beige colour |
| Control B | 0.80 | dark brown colour |
| Soy sauce C | 0.36 | light beige colour |

Thus, it will be seen that the method according to the invention makes it possible to obtain a powdered soy sauce having characteristics comparable to those of an untreated soy sauce which does not contain cysteine, i.e., having a clear colour and a slightly meaty taste.

The soy sauce which contained no cysteine and which was heat treated was by contrast of a very dark colour.

EXAMPLE 2

A powdered soy sauce with a dry matter content of 99% was prepared in accordance with European Patent 417481.

Cysteine, in the quantities indicated below, HCl and $H_2O$ were added to the sauce to enable a paste having a dry matter content of 85% to be obtained. The paste was then heat treated in a jacketed reactor at a temperature of 100° C. for a variable period.

After heat treatment, the paste was allowed to cool and dried at 70° C. under a reduced pressure of 15 mbar for approximately 8 hours to enable a powder containing 99% dry matter to be obtained.

The powder was then ground in a hammer mill.

Measurement of the extinction coefficient under the same conditions as in Example 1 yielded the following results:

| Sample | Cysteine (% by weight of dry matter) | Treatment time (hours) | Extinction coefficient |
| --- | --- | --- | --- |
| D | 0 | 1 | 0.97 |
| E | 1 | 1 | 0.66 |
| F | 5 | 5 | 0.38 |

Sauce E, which contained cysteine, was of a very much clearer colour after heat treatment than sauce D which did not contain cysteine.

Furthermore, sauce F, which was subjected to longer heat treatment than sauce E, had a clearer colour due to the presence of a larger quantity of cysteine.

EXAMPLE 3

Soy sauce C (1% cysteine, treated at 100° C. for 5 hours) and control sauce A (no cysteine, no heat treatment), prepared in accordance with Example 1, were stored for 4 months at different temperatures.

The extinction coefficient for the various sauces was then determined in accordance with Example 1.

The following results were obtained:

|  | Storage temperature (°C.) | | | | |
| --- | --- | --- | --- | --- | --- |
|  | −25 | +20 | +25 | +30 | +37 |
| Sauce C | 0.36 | 0.36 | 0.37 | 0.42 | 0.89 |
| Control A | 0.36 | 0.36 | 0.39 | 0.43 | 1.53 |

The following results were obtained after six months' storage:

|  | Storage temperature (°C.) | | | |
| --- | --- | --- | --- | --- |
|  | −25 | +20 | +25 | +30 |
| Sauce C | 0.35 | 0.38 | 0.38 | 0.43 |
| Control A | 0.36 | 0.37 | 0.41 | 0.52 |

After long term storage at a temperature of 25° C. or less almost no difference was observed between the sauce according to the invention and the control sauce.

After 6 months' storage at 30° C. the control sauce had a darker colour than the sauce according to the invention, which confirms the "protective" role played by cysteine during storage.

The change in colour in the case of the sauces stored at 37° C. might have been due to the sudden release of water of crystallisation contained in the sauces. Even in this case it was observed that the effect was less pronounced in the case of the sauce according to the invention.

EXAMPLE 4

A powdered soy sauce containing a dry matter content of 98% was prepared.

Cysteine, in the quantities indicated below, HCl and $H_2O$ were added to the sauce to enable a paste having a dry matter content of 85% to be obtained, which was then heat treated for 1 hour at 100° C. in a jacketed reactor.

After this treatment, the paste was allowed to cool and dried at 70° C. under a reduced pressure of 15 mbar until a powder having a maximum dry matter content of 98% was obtained.

The extinction coefficient of these various powders was measured using a spectrophotometer under the following conditions:

sample: 2.5 g in 50 ml cuvette: 1 cm wavelength: 550 nm

The same measurement was performed for a control powder which did not contain cysteine and which had not been heat treated (sample G).

The following results were obtained:

| Sample | Cysteine (% by weight of dry matter) | Extinction coefficient |
| --- | --- | --- |
| Without heat treatment | | |
| Control G | 0 | 0.88 |
| With heat treatment | | |
| Control H | 0 | 2.38 |
| Paste I | 1 | 1.62 |
| Paste J | 2 | 1.16 |
| Paste K | 5 | 0.93 |
| Paste L | 10 | 0.76 |

This example confirms the protective effect of the method according to the invention, i.e., the combination of the addition of cysteine and heat treatment.

EXAMPLE 5

A flavouring agent having a dry matter content of 30% was prepared in accordance with European Patent 429 760.

1% by weight of dry matter of cysteine, HCl and $H_2O$ were added to the flavouring agent. The mixture obtained was then heat treated in a jacketed reactor at a temperature of 100° C. for 5 hours.

The mixture was then allowed to cool to approximately 60°–70° C. and then concentrated in an evaporator at a temperature of 65° C. until a dry matter content of 85% was obtained.

The paste obtained was then dried in a dryer at 70° C. under a reduced pressure of 15 mbar for approximately 8 hours until a dry matter content of 98% was obtained, and then ground in a hammer mill.

A clear coloured powdered flavouring agent was obtained in this way.

The extinction coefficient of an aqueous solution containing 1% of the powdered flavouring agent was determined using a spectrophotometer under the following operating conditions:

cuvette: 1 cm wavelength: 500 nm

This coefficient was determined:

immediately after preparation of the flavouring agent (t=0), after 4 months' storage at a given temperature (t= 4 months), and after 6 months' storage at a given temperature (t= 6 months).

For comparison, the extinction coefficient of a 1% solution of a control flavouring agent prepared in accordance with European Patent 429 760, concentrated and dried in the manner described above, but containing no cysteine, and which had not undergone heat treatment, was determined under the same conditions.

The following results were obtained:

| Storage temperature | Extinction coefficient (%) | |
| --- | --- | --- |
|  | Control | Flavouring agent |
| t = 0 | — | — |
| t = 4 months | | |
| −25° C. | 0.33 | 0.31 |
| +20° C. | 0.32 | 0.31 |
| +25° C. | 0.32 | 0.31 |
| +30° C. | 0.32 | 0.31 |
| +37° C. | 0.47 | 0.34 |
| t = 6 months | | |
| −25° C. | 0.32 | 0.32 |
| +20° C. | 0.31 | 0.31 |
| +25° C. | 0.32 | 0.32 |
| +30° C. | 0.33 | 0.32 |
| +37° C. | 0.53 | 0.35 |

The flavouring agent according to the invention thus had similar properties to the control agent, from the point of view of colour and taste, prior to storage. These properties remained comparable when the flavouring agents were stored at a temperature below 30° C. When stored at 37° C., the flavouring agent according to the invention browned very much less quickly than the control agent. This may be due to the fact that the water of crystallisation present in the control agent is suddenly released, which results in a change in the activity of the water (Aw).

We claim:

1. A process for treating a soy sauce composition comprising incorporating into a soy sauce composition a substance selected from the group consisting of cystine and thiamine and compounds which contain a thiol group in an amount of from 0.01 part to 0.1 part by weight and then heat treating the soy sauce and substance at a temperature of from 95° C. to 110° C. for from 1 hour to 5 hours to obtain a treated soy sauce composition.

2. A process according to claim 1 wherein the substance is hydrogen sulfide.

3. A process according to claim 1 wherein the substance is cystein.

4. A process according to claim 1 wherein the soy sauce composition to be treated is in a form selected from the group consisting of a liquid form, a paste form and a dehydrated form.

5. A process according to claim 1 wherein the soy sauce composition to be treated is in a liquid form and the heat treatment is carried out under reflux conditions.

6. A process according to claim 1 wherein the soy sauce composition to be treated is in a liquid form and further comprising concentrating the treated soy sauce composition to obtain a paste and then drying the paste and grinding the dried paste to obtain a powder.

7. A process according to claim 1 wherein the soy sauce composition to be treated is in a paste form and further comprising dehydrating the treated soy sauce paste and grinding the dried paste to form a powder.

8. A process according to claim 1 wherein the soy sauce composition to be treated is in a dehydrated powder form and further comprising adding 0.15 part to 0.3 part water by weight to the powder to form a paste and then heat treating the paste.

9. A process for preparing a soy sauce composition comprising fermenting a mixture of cooked soya and roasted wheat with a koji culture to prepare a koji, hydrolyzing the koji in aqueous suspension at a temperature of from 45° C. to 60° C. for from 3 hours to 8 hours to obtain a hydrolyzed koji suspension, adding sodium chloride to the hydrolyzed suspension to prepare a moromi, fermenting the moromi to obtain a fermented moromi, pressing the fermented moromi to obtain a liquor, pasteurizing the liquor and clarifying the pasteurized liquor to obtain a soy sauce composition, and then, incorporating into the soy sauce composition a substance selected from the group consisting of cystine and thiamine and compounds which contain a thiol group in an amount of from 0.01 part to 0.1 part by weight and then heat treating the soy sauce composition and substance at a temperature of from 95° C. to 100° C. for from 1 hour to 5 hours to obtain a treated soy sauce composition.

10. A process according to claim 9 wherein the substance is hydrogen sulfide.

11. A process according to claim 9 wherein the substance is cysteine.

12. A process according to claim 9 further comprising comprising concentrating the soy sauce composition to obtain a soy sauce paste and then incorporating the substance into the paste and then heat treating.

13. A process for preparing a flavoring agent comprising hydrolyzing a protein material in aqueous suspension at a pH of from 6 to 11 with a protease, heat treating the hydrolyzed suspension at a pH of from 4.6 to 6.5, maturing the heat treated suspension with enzymes of koji and then pressing the matured suspension to obtain a juice, pasteurizing the juice and clarifying the pasteurized juice to obtain a first flavoring agent, and then incorporating into the first flavoring agent a substance selected from the group consisting of cystine and thiamine and compounds which contain a thiol group in an amount of from 0.01 part to 0.1 part by weight and then heat treating the first flavoring agent and substance at a temperature of from 95° C. to 110° C. for from 1 hour to 5 hours to obtain a second flavoring agent.

14. A process according to claim 13 wherein the substance is hydrogen sulfide.

15. A process according to claim 13 wherein the substance is cysteine.

16. A process according to claim 13 further comprising concentrating the first flavoring agent and then incorporating the substance into the concentrated agent and then heat treating.

* * * * *

UNITED STATES PATENT AND TRADEMARK OFFICE
CERTIFICATE OF CORRECTION

PATENT NO. : 5,480,663
DATED : January 2, 1996
INVENTOR(S) : Heyland, et al.

It is certified that error appears in the above-indentified patent and that said Letters Patent is hereby corrected as shown below:

Column 2, line 3, change the comma to a period and then delete "carbohydrates" and then, delete lines 4-8 of column 2.

Column 2, line 32, delete "on" and insert therefor --or--.

Signed and Sealed this

Thirtieth Day of April, 1996

Attest:

BRUCE LEHMAN

Attesting Officer

Commissioner of Patents and Trademarks